United States Patent [19]

Akimoto et al.

[11] Patent Number: 5,590,243
[45] Date of Patent: Dec. 31, 1996

[54] NEURAL NETWORK SYSTEM WITH SAMPLING DATA

[75] Inventors: Yoshiakira Akimoto, Kanagawa-ken; Hideo Tanaka; Hiromi Ogi, both of Tokyo; Yoshio Izui, Hyogo-ken; Hisao Taoka, Hyogo-ken; Toshiaki Sakaguchi, Hyogo-ken, all of Japan

[73] Assignee: Mitsubishi Denki Kabushiki Kaisha, Tokyo, Japan

[21] Appl. No.: 317,215

[22] Filed: Oct. 3, 1994

Related U.S. Application Data

[63] Continuation of Ser. No. 728,540, Jul. 11, 1991, abandoned.

[30] Foreign Application Priority Data

Jul. 12, 1990 [JP] Japan ................................ 2-186496
Jul. 12, 1990 [JP] Japan ................................ 2-186499

[51] Int. Cl.$^6$ .................................................. G06F 15/18
[52] U.S. Cl. ................................ 395/23; 395/21; 395/22; 395/24
[58] Field of Search .............................. 395/21, 22, 23, 395/24

[56] References Cited

U.S. PATENT DOCUMENTS

| | | | |
|---|---|---|---|
| 4,874,963 | 10/1989 | Alspector | 395/24 |
| 4,912,654 | 3/1990 | Wood | 395/23 |
| 5,046,020 | 9/1991 | Filkin | 395/23 |
| 5,052,043 | 9/1991 | Goborski | 395/23 |
| 5,056,037 | 10/1991 | Eberhardt | 395/23 |
| 5,107,454 | 4/1992 | Niki | 395/24 |
| 5,129,039 | 7/1992 | Hiraiwa | 395/24 |
| 5,142,666 | 8/1992 | Yoshizawa et al. | 395/27 |
| 5,148,045 | 9/1992 | Oyanagi | 395/23 |
| 5,168,550 | 12/1992 | Sakaue et al. | 395/23 |
| 5,175,796 | 12/1992 | Refregier et al. | 395/22 |

OTHER PUBLICATIONS

Specht Probabality Neural Network for Classification, Mapping, or Associative Memory, IEEE Int. Conf. on Neural Networks, Jul. 1988.

Wasserman et al, "Neural Network, part 2" IEEE Expert, 1988.

Littleston et al, "Learning in Layered Network with Many Fixed-function Hidden Nodes" IEEE Ist Int. Conf. on Neural Networks, Jun. 1987.

(List continued on next page.)

*Primary Examiner*—George B. Davis
*Attorney, Agent, or Firm*—Wolf, Greenfield & Sacks, P.C.

[57] ABSTRACT

A neural network system includes input, intermediate and output layers, each layer containing at least one neural network element, each having an input and output, for simulating a neuron; and a plurality of inter-layer connections between neural elements wherein each input layer element has a connection to at least one intermediate layer element, and each intermediate layer element has a connection to at least one output layer element. Each inter-layer connection has a connecting weight. The system further includes sampling data and teaming data. The sampling data has pairs of values, each pair including an input value and corresponding output value, the input value having regular intervals. The learning data has at least three pairs of values, each pair including an input value and corresponding desired output value, the input values having irregular intervals. The intermediate layer elements are assigned unique sampling data value pairs and have unique sampling functions derived by translating original sampling functions by sampling data input values assigned to the neural elements. The sampling function defines a relationship between the input and output of the neural element. The connecting weight for each connection between an intermediate layer element and an output layer element is set to the sampling data output value assigned to the intermediate layer element. The system further includes a training mechanism that adjusts the connecting weights to minimize errors between learning data output values and actual output values obtained by applying the learning data input values to the neural network.

35 Claims, 10 Drawing Sheets

OTHER PUBLICATIONS

Richard O. Duda, Peter E. Hart, "Pattern Classification and Scene Analysis", 1973, pp. 88–99, 172–175, Wiley–Interscience Publication.

Learning Representations by Back–Propagating Errors, Rumelhart, et al., pp. 533–536, Nature vol. 323, Oct. 9, 1986.

A Neural Model of Interpolation or Interpolation with Blobs, Shustorovich, pp. 529–532, Eastman Kodak Company.

Theory of the Back–Propagation Neural Network, Hecht–Nielson, pp. 593–605, HNC, Inc., Univ. of California at San Diego.

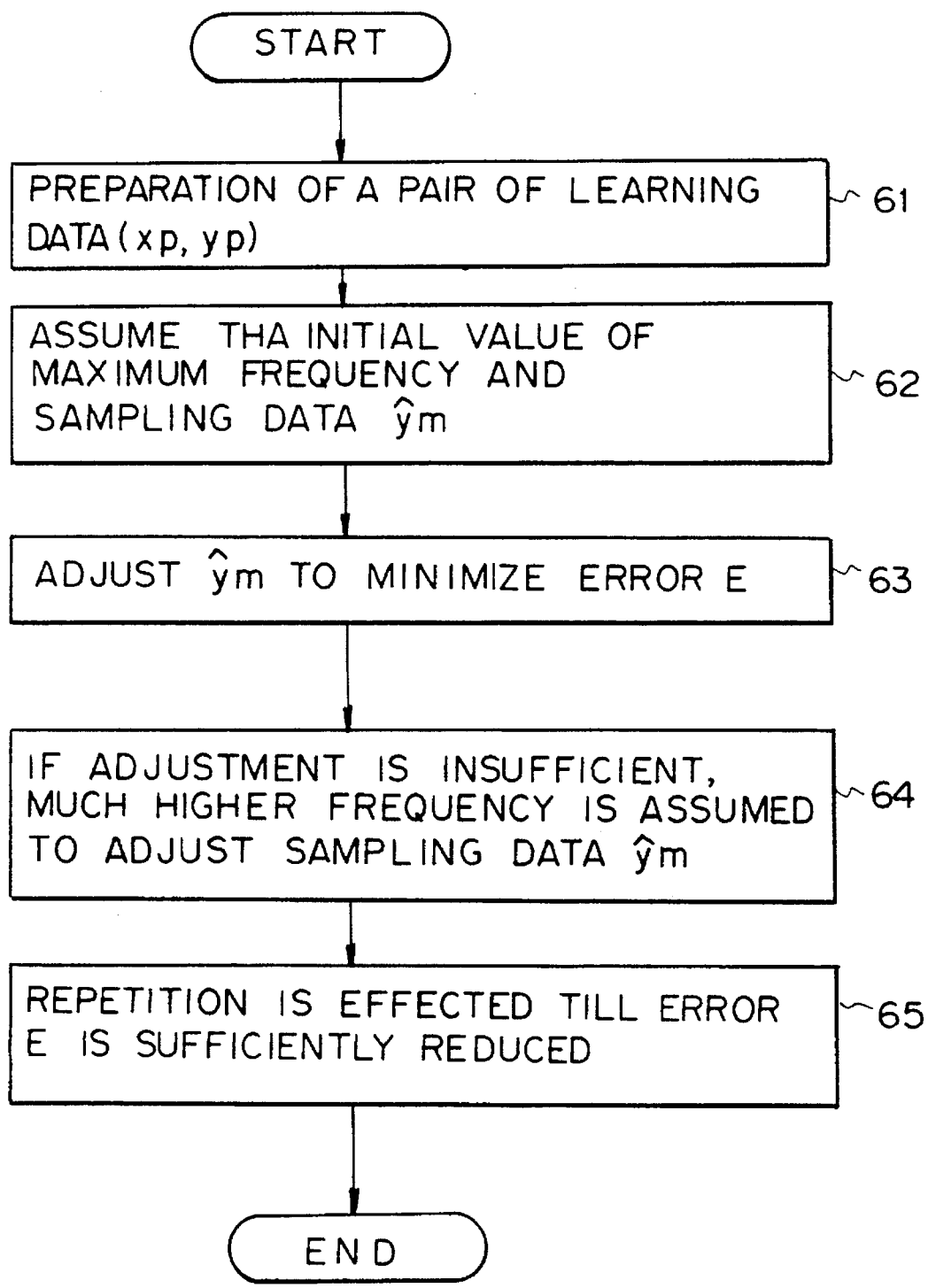

NEURAL NETWORK SYSTEM WITH SAMPLING DATA

This application is a continuation of application Ser. No. 07/728,540, filed Jul. 11, 1991, now abandoned.

BACKGROUND OF THE INVENTION

The present invention is directed to a neural network system for effecting storage, inference, pattern recognition, control, model estimation and approximation of functions by simulating neurons and connections therebetween.

FIG. 11 is an explanatory diagram illustrating an architecture of a conventional multilayer feedforward type neural network system reported, e.g., by David E, Rumelhart, Geoffery E. Hinton & Ronald J. Williams, in "Learning representations by back-propagating errors", Nature, Vol. 323, No. 9, pp. 533–536, October, 1986. In the same Figure, for instance, each of an input layer, an intermediate layer and an output layer is composed of a single layer. The input layer consists of three neural elements. The intermediate layer consists of four neural elements. The output layer consists of one neural element. Referring to FIG. 11, the numeral (11) represents an element (hereinafter referred to as a neural element) which simulates a neuron. The neural element is composed of an input layer (11a), an intermediate layer (11b), and an output layer (11c). Designated at (12) is an element (hereinafter referred to as a connecting element) which simulates a synapse by making an inter-layer connection of the neural element (11). The strength of this connection is known as a connecting weight.

In the thus configured neural network system, the neural elements (11) are layer-connected. As dynamics, an input signal coming from the input layer (11a) is, as indicated by an arrowhead A, propagated via the intermediate layer (11b) to the output layer (11c).

The following is a quantitative representation. Let $V^p_{li}$ be the i-th value of the p-th learning data in the input layer (11a), let $d_{kp}$ be the k-th value of the p-th learning data in the output layer (11c), let $U_{hj}$, $V_{hj}$ be the internal state and the output value of the j-th neural element of h-th layer, and let $W_{hji}$ be the connecting weight between the i-th neural element in the h-th layer and the j-th neural element in the (h+1)th layer. In this embodiment, h=1 in the input layer (11a), h=2 in the intermediate layer (11b), and h=3 in the output layer (11c). At this time, relations between the respective variables are expressed by formulae (1) and (2):

$$u_{hj} = \sum_i W_{h-1ji} V_{h-1i} \quad (1)$$

$$V_{hi} = g(u_{hi}) \quad (2)$$

where the function g(*) may be a differentiable but non-reductive function. The formula (3) shows one example thereof. This function is shown in FIG. 12, with u being given on the axis of abscissa and g(u) being given on the axis of ordinate.

$$g(X) = \frac{1}{1 + e^{-X}} \quad (3)$$

Furthermore, the connecting weights W are sequentially determined according to a learning rule shown in the formula (4). More specifically, the weights W are sequentially determined by the steepest descent method associated with a squares-error defined by the learning data $d_{ip}$ (a desired signal) in the output layer and a value actually obtained by the neural network. The squares-error is expressed by the following formula (4):

$$E = \frac{1}{2} \sum_p \sum_k (V_{Hk} - d_{kp})^2 \quad (4)$$

where H (=3) is the number of layers of the neural network.

Besides, sequential variations in the connecting weight W is executable in conformity with the formula (5) by using the moment method:

$$\frac{d^2 W_{hji}}{dt^2} + (1 - \alpha) \frac{dW_{hji}}{dt} = -\beta \frac{\partial E}{\partial W_{hji}} \quad (5)$$

where $\alpha$ and $\beta$ are appropriate parameters.

On the occasion of the actual use, the formula (5) is differentiated, and to describe the right side in much greater detail, learning is performed by adjusting the connecting weight W, while an output error is, as indicated by an arrowhead B, propagated from the output side to the input side. This is known as a back-propagation.

A distribution of an initial value of the connecting weight is usually expressed by a formula (6), uniform:

$$P(W_{hjio}) = \begin{cases} \frac{1}{2W_o} & -W_o \leq W_{hjio} \leq W_o \\ 0 & \text{others} \end{cases} \quad (6)$$

where $W_{hjio}$ is the initial value of the connecting weight, and $p(W_{hjio})$ is the probability thereof.

Namely, the uniformly distributed initial value is set as a connecting weight, and repetitive arithmetic operations are performed fundamentally in accordance with the learning equation (4), defined as the steepest descent method so as to minimize the squares-error in the output layer (11c).

The prior art neural network system is configured in the manner discussed above. Hence, the inter-layer connecting weight is obtained by the repetitive arithmetic operations to minimize the squares-error in the output layer as a learning operation. This in turn presents the problem of requiring a good deal of time for learning. Namely, the problem is that a large amount of time is needed for convergence of the repetitive arithmetic operations in the learning algorithm. Besides, necessary numbers of the intermediate layers and of the neural elements in the respective layers are not known beforehand.

It is a primary object of the present invention, which has been devised to obviate the forgoing problems, to provide a neural network system capable of fast learning by speeding up convergence of repetitive arithmetic operations for learning and previously determining the number of neural elements of an intermediate layer.

SUMMARY OF THE INVENTION

An arrangement of a neural network system of the present invention is that sampling data configured by pairs of regular interval input values and output values corresponding thereto are assumed with respect to learning data configured by pairs of irregular interval input values and output values corresponding thereto, the neural element of the intermediate layer stores a sampling function which moves in parallel with the input value of the sampling data, the output value of the sampling data is set as the connecting weight for providing the connection between the intermediate layer and the output layer, and the output value of the sampling data is adjusted by a learning equation to locally minimize an error between the output value of the learning data and the output obtained when giving the input value of the learning data; or that after, as mentioned before, assuming the sampling data, a function with which the sampling data is created is expanded by a sampling function; the sampling function is expanded by a trigonometric function to obtain a frequency, the trigonometric function is approximated by a sigmoid function; the frequency is set as the connecting weight for providing the connection between the input layer and the intermediate layer by use of these procedures, a value calculated from the frequency and the input value of the sampling data is set as a bias of the intermediate layer, a value calculated from the frequency, the input value of the sampling data and the output value of the sampling data is set as the connecting weight for providing the connection between the intermediate layer and the output layer, and the output value of the sampling data is adjusted by a learning equation to locally minimize an error between the output value of the learning data and the output obtained when giving the input value of the learning data.

According to the first aspect of the neural network system of this invention, the sampling data sampled at regular intervals are assumed with respect to the learning data configured by the pairs of output values and input values which are obtained at irregular intervals. Stored in the neural element of the intermediate layer is the sampling function which moves by the input value of the sampling data. The output value of the sampling data is set as a connecting weight between the input layer and the output layer. When giving the input value of the learning data to the neural network system, the connecting weight defined as an output value of the sampling data is adjusted so that the output of the neural network system becomes a desired output value, thus performing learning. Hence, the repetitive computations in learning are very fast, whereby high-speed learning can be attained. As in the sampling theorem, when knowing the intricacy of the information source from which the learning data is created, i.e., the maximum frequency, the number of neural elements of the intermediate layer can be determined.

According to a second aspect of the neural network system of this invention, the sampling data configured by regular interval inputs and outputs are assumed with respect to the learning data configured by the pairs of outputs and inputs which are obtained at irregular intervals. The function with which this sampling data is created is expanded by the sampling function. The sampling function is expanded by the trigonometric function, thereby obtaining a frequency. The frequency is set as the connecting weight between the input layer and the intermediate layer. Set as a bias of the intermediate layer is a value calculated from the frequency and the input value of the sampling data. Set as a connecting weight, an initial value, between the intermediate layer and the output layer is a value obtained by multiplying a value calculated from the input value of the sampling data and the frequency by the output value of the sampling data and a certain coefficient. When inputting the input value of the learning data to the neural network system set as above, the output value of the learning data is obtained as an output. For this purpose, the output value of the assumed sampling data is adjusted by the repetitive computations, thereby adjusting the connecting weight between the intermediate layer and the output layer. In this manner, the corresponding learning data output is obtained when giving the input of the learning data. Therefore, the initial value of the connecting weight calculated from the assumed sampling data is approximate to the final value. If the convergence is insufficient with the assumed sampling data, it is possible to easily create the new assumed sampling data from the present assumed sampling data by a method of increasing the maximum frequency. The repetitive arithmetic operations are relatively small and fast learning is attainable.

BRIEF DESCRIPTION OF THE DRAWINGS

FIG. 6 is a flowchart showing the entire operations in the first embodiment;

DETAILED DESCRIPTION OF THE PREFERRED EMBODIMENTS

Figure 1:
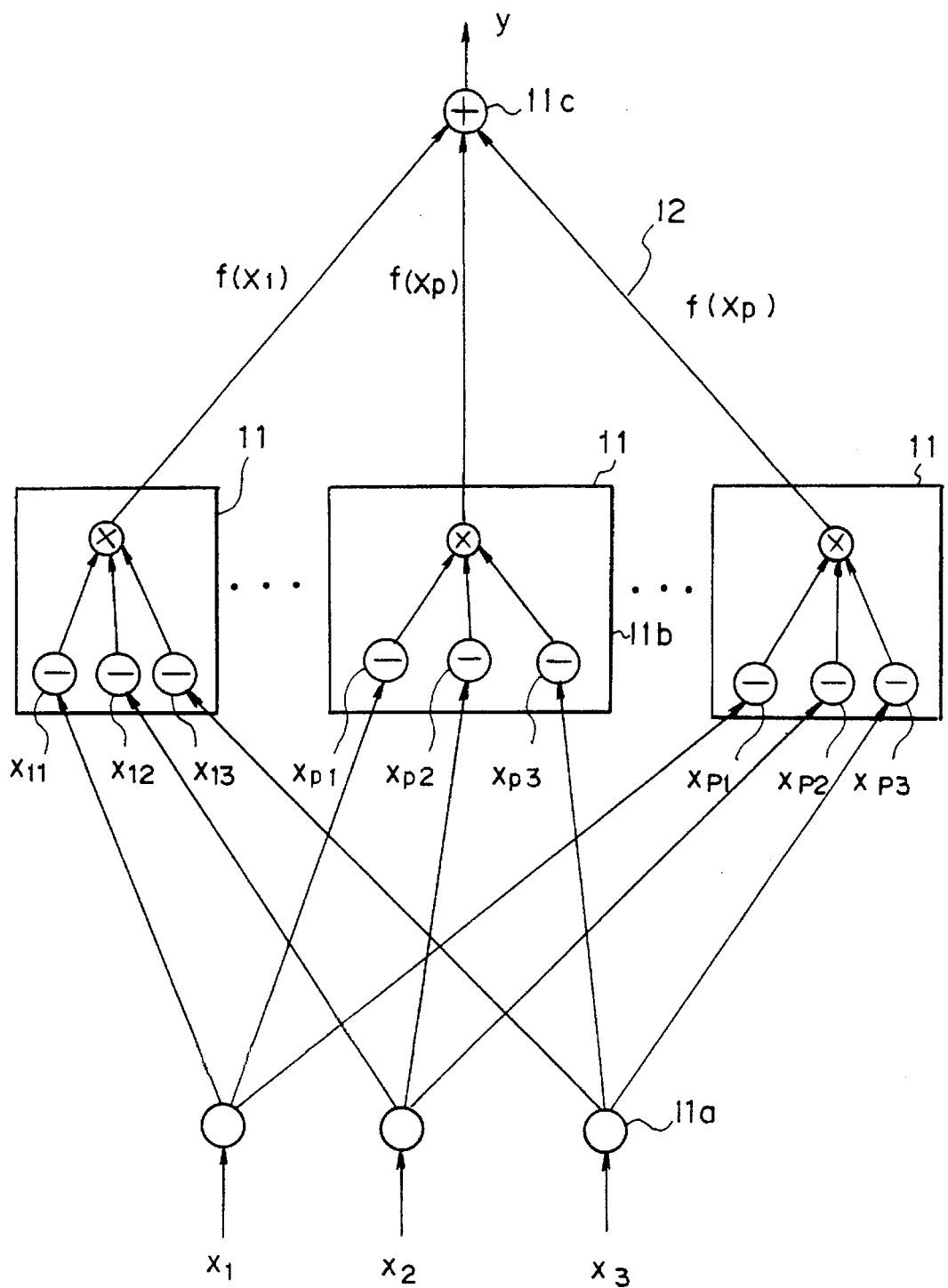
FIG. 1 is an explanatory diagram illustrating an architecture of a first embodiment of a neural network system according to the present invention.
Figure 2:
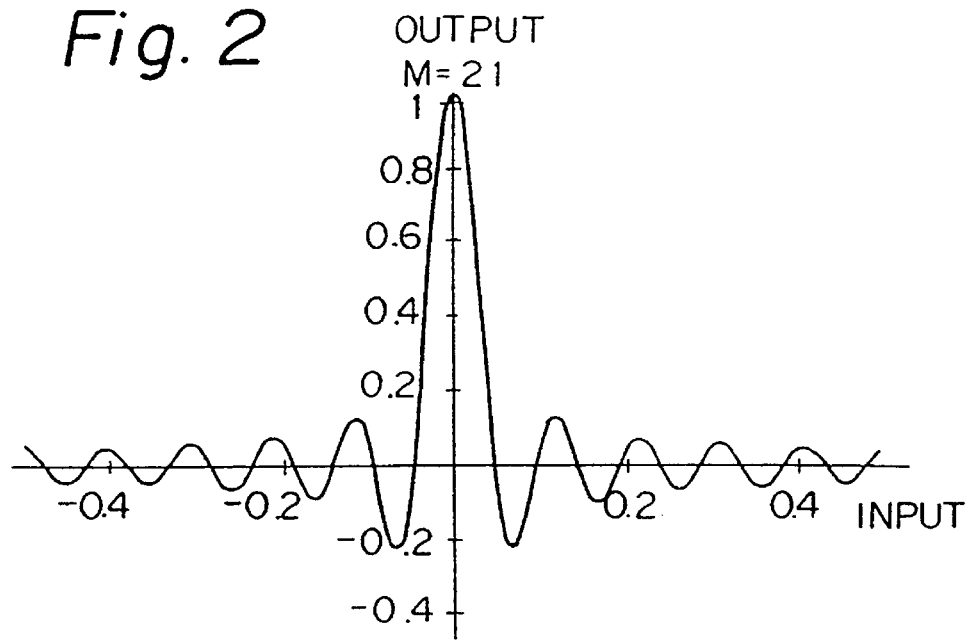
FIG. 2 is a characteristic diagram showing I/O characteristics of a neural element in the first embodiment.

FIG. 1 is an explanatory diagram illustrating an architecture of a neural network system in a first embodiment of this invention. Designated at (11) in the same Figure is a neural element composed of an input layer (11a), an intermediate layer (11b), and an output layer (11c). At (12) is a connecting weight between the neural elements (11). FIG. 2 shows one example of I/O characteristics of the neural elements (11), wherein input values are given on the axis of abscissa, while output values are given on the axis of ordinate to exhibit a relation therebetween. Shown also is a case where the sample number (M) is 21 when being one-dimensional.

Figure 3:
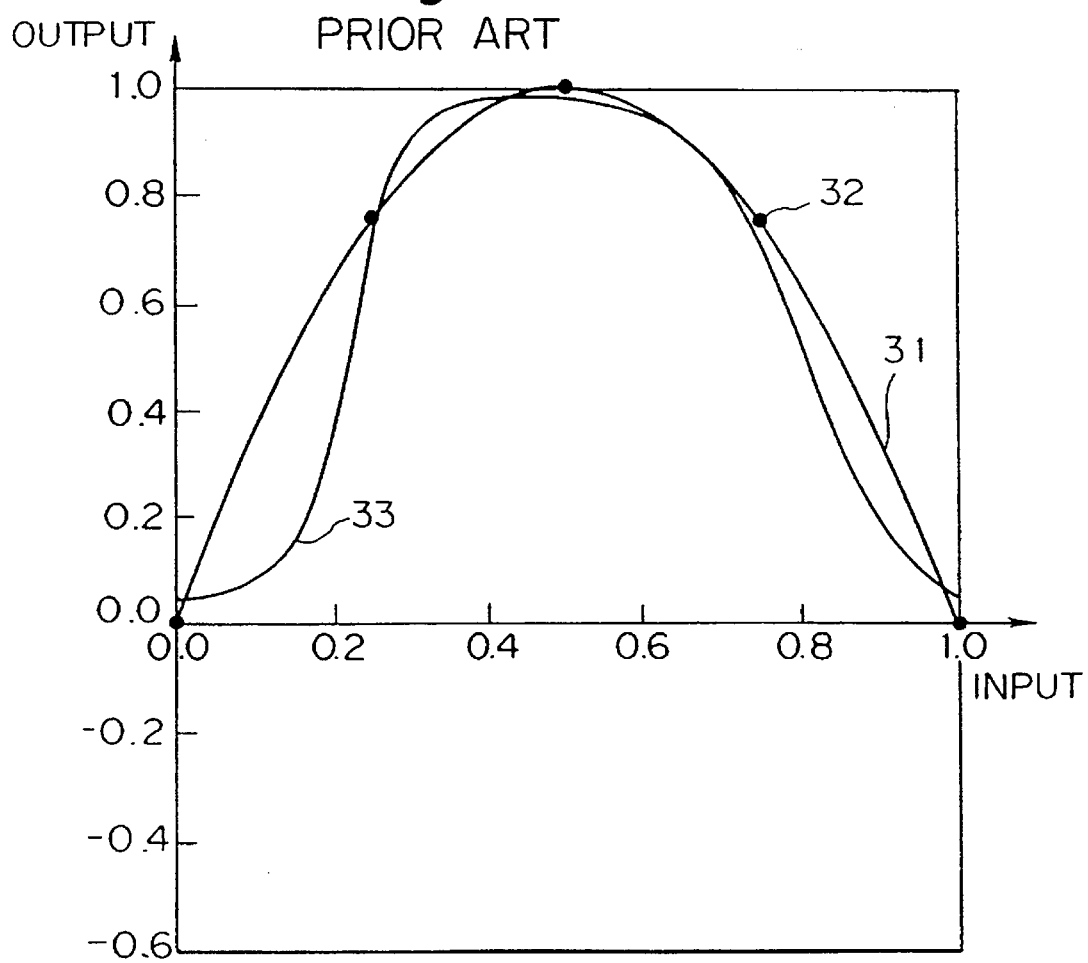
FIG. 3 is a graphic chart showing functions in operation of a conventional multilayer feedforward type neural network system.

A function of the prior art multilayer feedforward type neural network system will be described with reference to FIG. 3. In FIG. 3, the numeral (31) denotes a parabola of the original function with the learning data are generated. Five black circles (32) represent learning data; and (33) an interpolated curve regenerated by the conventional 3-layer neural network. Referring to FIG. 3, the axis of abscissa Indicates an input, while the axis of ordinate indicates an output. In a comparison between the regenerated curve (33)

and the original curve (31), a value approximate to the output value of the original curve (31) is generated in the learning data (32). In other portions, the interpolation is effected, and the curve is regenerated. In this manner, the prior art system essentially performs a function to make the interpolation between the input and the output when giving the input and the output.

Figure 12:
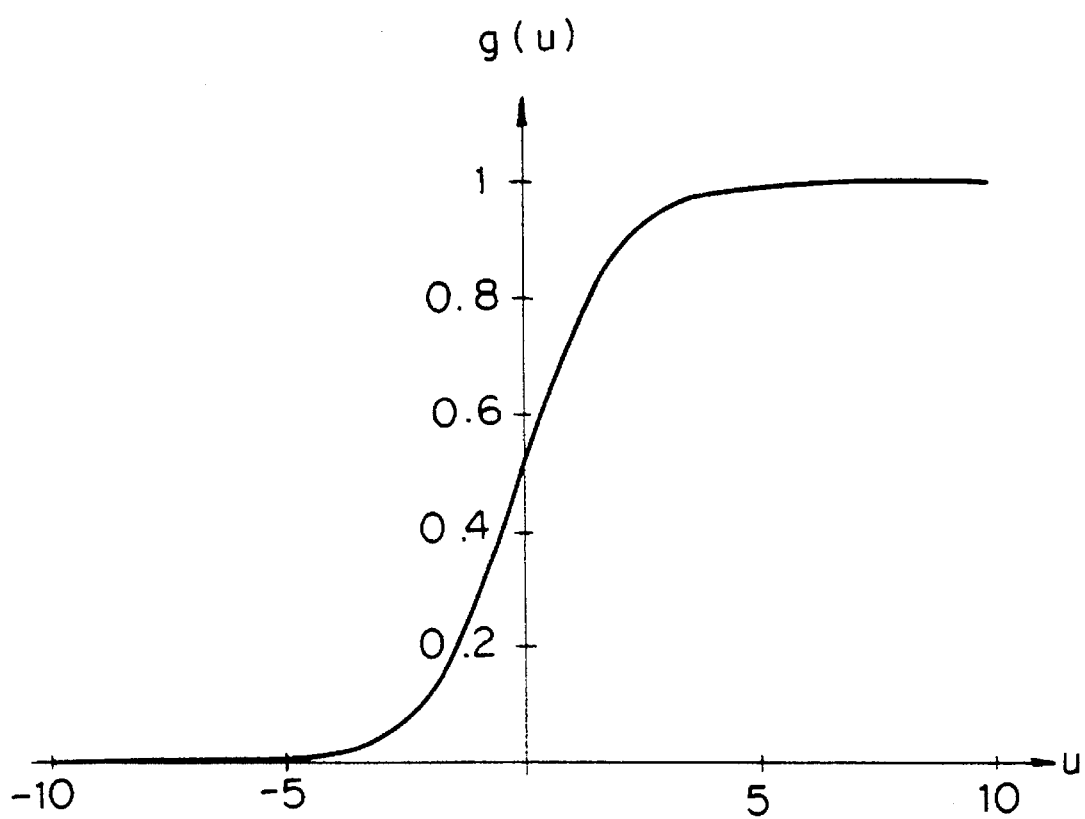
FIG. 12 is a characteristic diagram showing I/O characteristics of a neural element in the prior art system.

The conventional neural network system functions in the way discussed above. Therefore, as the neural element (11), the function shown In FIG. 2 is employed in place of a so-called sigmoid function shown in FIG. 12, whereby the same function is attainable.

Figure 4:
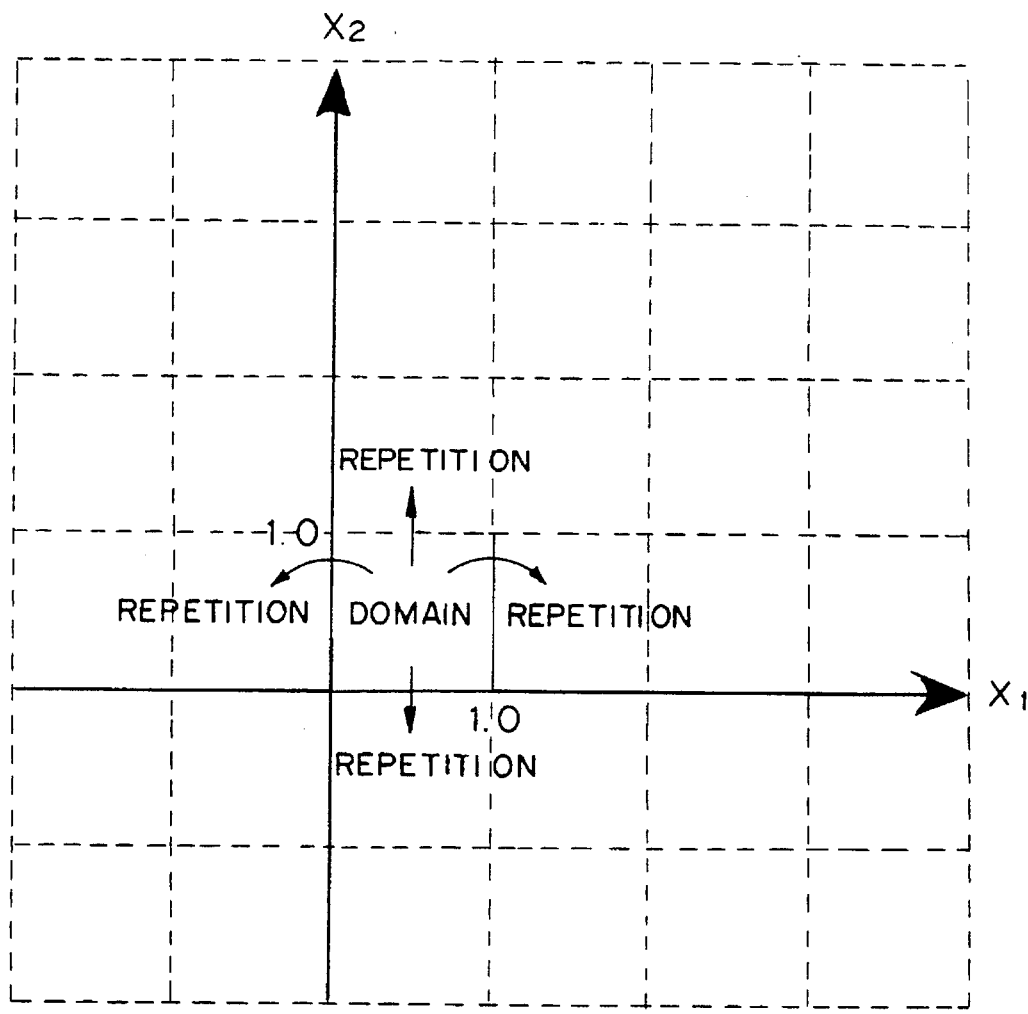
FIG. 4 is an explanatory diagram showing the domain of a function to be approximated in the embodiments of this invention.

For this reason, the explanation starts with touching on a Fourier expansion. Periodic functions may be Fourier-expanded. If a domain of the function y=f(X) is defined as a hypercube in which a length of one side is 1. In other spaces, it may be assumed that the domain is repeated with a period of 1, and hence the periodicity is provided on the whole. FIG. 4 shows a domain in the case of 2-dimensions. Hence, the function y=f(X) is Fourier-expanded as follows:

$$y = f(X) = \lim_{K \to \infty} \sum_{k=-K}^{K} C_k e^{2\pi j(k,X)} \tag{7}$$

$$C_k = \int_{[0,1)^N} f(X) e^{-2\pi j(k,X)} dX \tag{8}$$

However, the formula (8) represents a strength of Fourier series of the frequency k contained in the function f(X), where N is the number of dimensions of input. The symbol K is the maximum frequency of the function f(X) and indicates that typically the frequencies up to the infinity are taken into consideration to restore the unknown function.

In order that the function f(X) is Fourier-expandable, the domain thereof has to exist in the hypercube. In general, however, it is a common practice that the actual learning data X' to be realized by the neural network system takes an arbitrary real value, which is contrary to the requirement of the hypercube. To cope with this, a proper normalization is effected for the input data, and the domain is set in the hypercube with its value serving as X.

Figure 5:
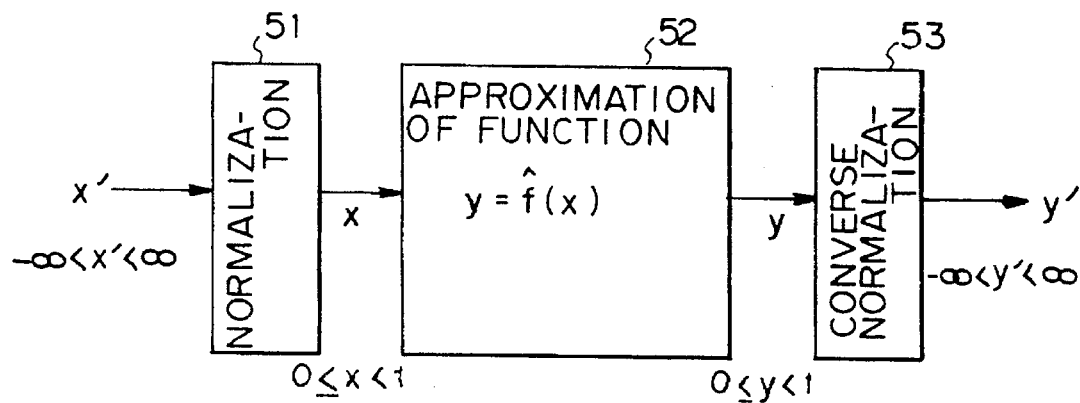
FIG. 5 is a diagram of operations of a whole system which include a normalization of an input variable and a converse normalization of an output variable.

Normally, it is also a common practice that the output y of the neural network system exists in the hypercube. Hence, a converse normalization is performed for obtaining an actual output data y'. That is, the operations of the whole system which include the I/O normalizations are shown in FIG. 5. To be more specific, the actual learning data X' defined as an arbitrary real value is normalized in a block (51). The function is approximated by the neural network system in a block (52). The output y thereof is conversely normalized in a block (53), thereby obtaining the actual output data y'. The normalization involves the use of, e.g., the following thinkable methods.

(1) Method using the sigmoid function; and (2) Method for performing an affine transformation.

If the domain of the actual variable is a full real value, and when using the sigmoid function, a non-linear transformation is effected within the hypercube.

$$\begin{cases} x_i = 1/(1 + e^{-x'_i}) \\ y'_i = \ln \dfrac{y_i}{1 - y_i} \end{cases} \tag{9}$$

If the domain of the data is previously clarified as below, $$\begin{cases} x'_i \in [X'_{iL}, X'_{iR}] \\ y'_i \in [Y_L, Y_R] \end{cases} \tag{10}$$

A region defined by the formula (10) is affine-transformed by the formula (11) and may be intruded into the hypercube.

$$\begin{cases} x_i = \dfrac{x'_i - X'_{iL}}{X'_{iR} - X'_{iL}} \\ y'_i = (Y_R - Y_L)y_i + Y_L \end{cases} \tag{11}$$

Let the f(X) be the function to be estimated. The transformation is executed in the following manner by use of the Formulae (7) and (8).

$$y = f(X)$$

$$= \lim_{K \to \infty} \sum_{k=-K}^{K} C_k e^{2\pi j(k,X)} \tag{12}$$

$$= \lim_{K \to \infty} \sum_{k=-K}^{K} \int_{[0,1)^N} f(X') e^{-2\pi j(k,X')} dX' e^{2\pi j(k,X)} \tag{13}$$

$$= \lim_{K \to \infty} \int_{[0,1)^N} f(X') \sum_{k=-K}^{K} e^{2\pi j(k,(X-X'))} dX' \tag{14}$$

$$= \lim_{K \to \infty} \int_{[0,1)^N} f(X') \times$$

$$\left\{ \prod_{i=1}^{N} \left( 1 + 2\cos(K_i + 1)\pi(x_i - x'_i) \dfrac{\sin K_i \pi(x_i - x'_i)}{\sin \pi(x_i - x'_i)} \right) \right\} dX' \tag{15}$$

$$= \lim_{K \to \infty} \int_{[0,1)^N} f(X') \left\{ \prod_{i=1}^{N} \dfrac{\sin(2K_i + 1)\pi(x_i - x'_i)}{\sin \pi(x_i - x'_i)} \right\} dX' \tag{16}$$

where {*} approaches a delta function when the maximum frequency K is sufficiently large. Namely, it can be interpreted that the function f(X) is configured by superposing the delta functions having a height of f(X') in X'.

The learning data are obtained only at irregular intervals. It is therefore impossible to accurately obtain an integration of the formula (16) if there are data sufficient enough to fill the domain. For simplicity, it is assumed that the learning data are regular, the irregular learning data are dealt with by using a result thereof. Now, supposing that the learning data are obtained very conveniently to divide the hypercube equally by 2ki+1=Mi, the integration of the formula (16) is effected based on differentiation. First, $$dx_i = \dfrac{1}{2K_i + 1} \tag{17}$$

$$= \dfrac{1}{M_i} \tag{18}$$

Further, the integrated value Is obtained at a representative point divided equally by Mi:

$$x_i = \dfrac{m_i}{2K_i + 1} \tag{19}$$

$$= \dfrac{m_i}{M_i} \quad (m_i = 0, \ldots, 2K_i) \tag{20}$$

Assuming that K is the maximum frequency the function f(X) has, $$y = f(X) \tag{21}$$

-continued $$= \sum_{m=0}^{M-1} f\left(\frac{m}{M}\right) \left\{ \prod_{i=1}^{N} \frac{\sin M_i \pi \left(x_i - \frac{m_i}{M_i}\right)}{M_i \sin \pi \left(x_i - \frac{m_i}{M_i}\right)} \right\} \quad (22)$$

However, $$M = 2K+1 \quad (23)$$

Moreover, the following rewrite is effected to make the meaning of the formula (22) clear:

$$y = f(X) \quad (24)$$

$$= \sum_{m=0}^{M-1} f\left(\frac{m}{M}\right) \phi\left(X - \frac{m}{M}\right) \quad (25)$$

$$= \sum_{m=0}^{M-1} f(X_m) \phi(X - X_m) \quad (26)$$

However, $$\phi(X) = \prod_{i=1}^{N} \phi_i(x_i) \quad (27)$$

$$\phi_i = \frac{\sin M_i \pi x_i}{M_i \sin \pi x_i} \quad (28)$$

where $\phi(X)$ is the function which approaches the delta function when Mi increases. The function becomes the one shown in FIG. 2, if input and output are one-dimensional, and when M=21.

It can be understood from the above that $y=f(X)$ is expanded by the base function $\phi(X)$. Namely it is a sampling theorem in which the domain is limited within the hypercube. Hence, when the maximum frequency K is known, the learning data may be acquired by only M shown in formula (23) as the lowest limit required for regenerating the function. Other learning data are not required. This implies that knowing an intricacy of the function, i.e., the maximum frequency leads to a recognition of the necessary number of learning data. If smaller than this number, this implies that the function is not completely reproducible. FIG. 1 is a 3-layer neural network expression of the formula (8). The intermediate layer (11b) in this embodiment may be composed such as P=21 pieces.

As discussed above, (2K+1) pieces of learning data are regularly obtained to equally divide the hypercube. In this case, the function is completely restorable as in the sampling theorem. However, it is herein assumed that the learning data is obtained only with irregularity. Hence, the regular data (hereinafter referred to as sampling data) is presumed in this case, and there is considered an error between the function restored from this data and the irregular data (hereinafter simply referred to as learning data). The sampling data is adjusted to locally minimize this error.

Let $(x_m, \hat{y}_m)$ be the sampling data, and let $(x_p, y_p)$ be the learning data. The error E is defined as below:

$$E = \frac{1}{2} \sum_{p=1}^{P} \{y_p - \hat{f}(X_p)\}^2 \quad (29)$$

However, $$\hat{f}(X_p) = \sum_{m=0}^{M-1} \hat{y}_m \phi(X_p - X_m) \quad (30)$$

Hence, to minimize the error E, for instance, the sampling data may be adjusted by using the steepest descent method as follows:

$$\hat{y}_m^{new} = \hat{y}_m^{old} + \Delta \hat{y}_m^{old} \quad (31)$$

However, $$\Delta \hat{y}_m^{old} = -\beta \frac{\partial E}{\partial \hat{y}_m^{old}} \quad (32)$$

$$= \beta \sum_{p=1}^{P} \left\{ y_p - \sum_{M=0}^{M-1} \hat{y}_m^{old} \phi(X_p - X_m) \right\} \phi(X_p - X_m) \quad (33)$$

Alternatively, as in the back propagation, the term of acceleration can be considered by using the moment method.

$$\frac{d^2 \hat{y}_m}{dt^2} + (1-\alpha) \frac{d \hat{y}_m}{dt} = -\beta \frac{\partial E}{\partial \hat{y}_m} \quad (34)$$

However, the formula (34) is defined as a learning equation described based not on the difference equation but on the differential equation.

Note that at this time the function f(X) which satisfies the learning data can not be theoretically configured when assuming no sampling data greater than the maximum frequency of the function with which the learning data is created. Hence, if the sampling data lack, it is required to increment the number of the sampling data by increasing the assumed maximum frequency.

FIG. 6 is a flowchart showing the whole operations. Pairs of learning data are prepared in step (61). Maximum frequency K and initial values of the sampling data are set in step (62). Next, the sampling data are adjusted to minimize the error E in the learning data in step (63). If the adjustment is insufficient in step (64), the sampling data are adjusted on the assumption of the much higher maximum frequency. If the error is sufficiently small in step (65), processing comes to an end.

A method of setting the initial value of the sampling data in step (62) may be based on an estimation from, e.g., $y_p$ in the vicinity thereof by a linear interpolation. As a method of incrementing the sampling data when the maximum frequency increases in step (64), there exists, e.g., a method of estimating the new sampling data from the old sampling data by the linear interpolation.

Figures 7A, 7B:
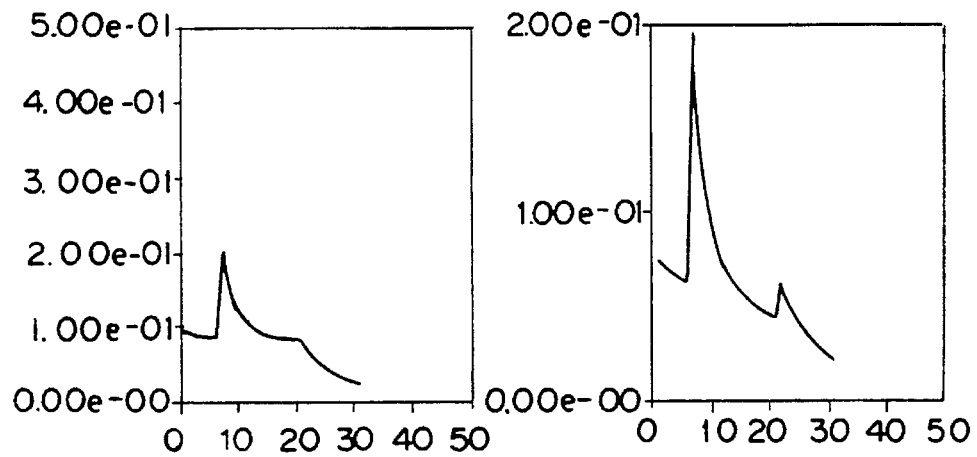
FIG. 7(a) is a graphic chart showing a reduction of error in the learning convergence.
FIG. 7(b) is a graphic chart showing a maximum value of absolute values of errors at learning data points.
Figure 7C:
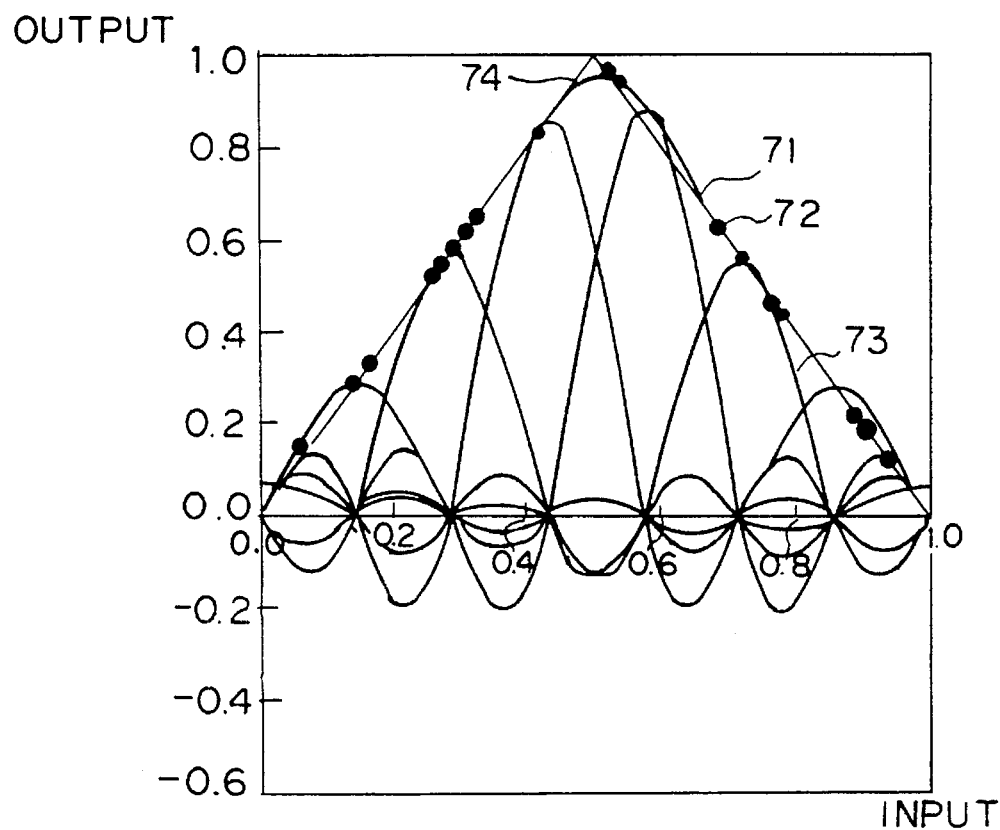
FIG. 7(c) is a graphic chart showing a relation between an original function and a function regenerated by the system in the first embodiment.

FIG. 7 shows results of convergence according to simulations. A function serving as an origin to generate the learning data (hereinafter referred to as an original function) is expressed by the formula (35) and takes a crest-like shape depicted by a line (71) of FIG. 7(c).

$$y = \begin{cases} 2x & 0 \leq x \leq \frac{1}{2} \\ -2x & \frac{1}{2} \leq x < 1 \end{cases} \quad (35)$$

Referring to FIG. 7(a), the axis of abscissa indicates the repetitive number, while the axis of ordinate indicates the square root of the error E. Referring to FIG. 7(b), the axis of abscissa indicates the repetitive number, while the axis of ordinate indicates the maximum value of the absolute value error. FIG. 7(c) is a graphic chart, wherein the axis of abscissa indicates the input, while the axis of ordinate indicates an output. Turning to FIGS. 7(a) and 7(b)., the error increases just when the maximum frequency is changed over. The reason for this is that the estimation by interpolation of the new sampling data is not enough. Referring to FIG. 7(c), black circles (72) represent the learning data, attenuated trigonometric functions represent the sampling functions, straight lines (71) which connect the learning data are the original functions, and curved lines (74) are the regenerated functions. In a comparison between the lines (71) and the lines (74), both of them exhibit well-regenerated states with a high accuracy.

Incidentally shown are results (Table 1) of speed comparison with the back propagation (BP) conceived as a conventional method. The conditions are shown as below:

(1) The original function is the crest-shaped function illustrated in FIG. 7.

(2) The computer employed is a general-purpose workstation.

(3) The number of intermediate layers of BP is 100.

(4) The irregular learning data is obtained at random from the original function.

(5) The Initial value of the maximum frequency is set to 1, and the repetitive arithmetic is performed while incrementing it by 1, 3, 5, 7 and so on.

Table 1 shows the comparative results in calculating time between the conventional example and this embodiment. In Table 1, the symbol—indicates that no simulation is carried out.

TABLE 1

| Number of Data | Conventional Example | Embodiment | Conventional Example-to-Embodiment Ratio |
|---|---|---|---|
| 2 | 20 sec | 41 sec | 0.5 |
| 3 | 8 min | 8 sec | 60 |
| 5 | 121 min | 4 sec | 1800 |
| 10 | Not converged in 5 hrs | 22 sec | — |
| 30 | — | 1 min 31 sec | — |
| 50 | — | 4 min 35 sec | — |
| 100 | — | 8 min 27 sec | — |
| 200 | — | 13 min 48 sec | — |

As is obvious from Table 1, the arithmetic operations are repeatedly performed. Hence, there arises a necessity for precisely regenerating the original function when incrementing the learning data, and it follows that it takes much learning time. The simulation takes place once herein, and there is a considerable influence on an initial values of a random number. This influence can be seen. In the conventional back propagation, though dependent on the set values of parameters, the learning the is very long, and the convergence is not attained when the data number is 10. In any case, it is obvious that the neural network system in this embodiment is much faster than the prior art system based on the back propagation.

As discussed above, the convergence of the repetitive arithmetic operations for learning is very fast, whereby the high-speed learning is attainable. Besides, when recognizing the intricacy of the information source from which the learning data is generated, i.e., the maximum frequency, it is possible to determine the number of neural elements of the intermediate layers required.

Note that the number of neural elements configuring the neural network and the number of layers thereof are not limited to those shown in the above-described embodiment but may be modified according to applied fields.

Figure 8:
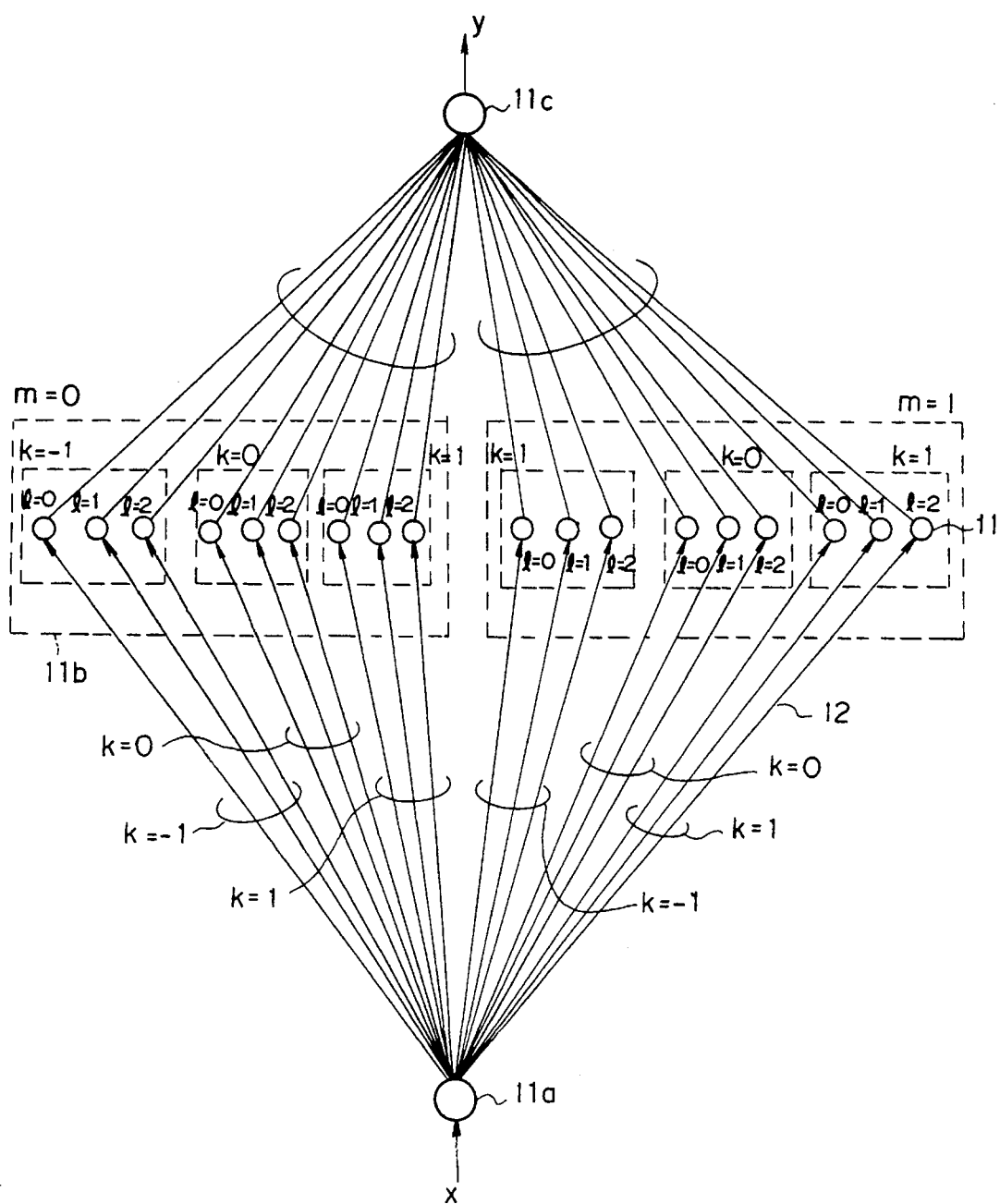
FIG. 8 is an explanatory diagram illustrating an architecture of the neural network system in a second embodiment of this invention.

FIG. 8 is an explanatory diagram depicting an architecture of the neural network system in a second embodiment of this invention. Designated at (11) in FIG. 8 is a neural element consisting of an input layer (11a), an intermediate layer (11b) and an output layer (11c). At (12) is a connecting weight between the neural elements (11). For simplicity, the Figure shows a case where particularly the input and output are one-dimensional. The maximum frequency K of the function with which the learning data is created is set to 1. The number of assumed sampling data is set to 2. The connecting weight thereof and a bias in the neural element in the Figure are determinedly obtained from the assumed maximum frequency K and the sampling data. Moreover, the connecting weight between the intermediate layer and the output layer is adjusted by a method such as the steepest descent method. A desired output is acquired when giving an Input of learning data to the input of the neural network system.

Now, let f(X) be the function with which the learning data or the assumed sampling data is generated, and let K be the maximum frequency thereof. This function undergoes the Fourier-expansion, with the result that the formula (36) becomes identical with the formula (7).

$$y = f(X) = \sum_{k=-K}^{K} C_k e^{2\pi j(k,X)} \quad (36)$$

Supposing herein that the sampling data has been obtained to regularly divide the interior, defined as a domain, of hypercube equally by M, a strength of each Fourier series can be approximated as shown in the formula (39).

$$C_k = \int_{[0,1)^N} f(X) e^{-2\pi j(k,X)} dX \quad (37)$$

$$\approx \sum_{m_1=0}^{M} \cdots \sum_{m_N=0}^{M} f\left(\frac{m_1}{M}, \ldots, \frac{m_N}{M}\right) e^{-2\pi j \sum_{i=1}^{N} k_i \frac{m_i}{M}} \frac{1}{M} \cdots \frac{1}{M} \quad (38)$$

$$= \left(\frac{1}{M}\right)^N \sum_{m=0}^{M} f\left(\frac{m}{M}\right) e^{-\frac{2\pi}{M} j(k,m)} \quad (39)$$

The formula (39) is substituted into the formula (36) as follows:

$$y = f(X) \quad (40)$$

$$= \sum_{k=-K}^{K} \left(\frac{1}{M}\right)^N \sum_{m=0}^{M} f\left(\frac{m}{M}\right) e^{-\frac{2\pi}{M} j(k,m)} e^{2\pi j(k,X)} \quad (41)$$

$$= \left(\frac{1}{M}\right)^N \sum_{k=-K}^{K} \sum_{m=0}^{M} f\left(\frac{m}{M}\right) e^{2\pi j((X-\frac{m}{M}),k)} \quad (42)$$

$$= \left(\frac{1}{M}\right)^N \sum_{k=-K}^{K} \sum_{m=0}^{M} f\left(\frac{m}{M}\right) \cos 2\pi\left(\left(X-\frac{m}{M}\right),k\right) \quad (43)$$

$$= \left(\frac{1}{M}\right)^N \sum_{m=0}^{M} f\left(\frac{m}{M}\right) \left\{ \sum_{k=-K}^{K} \cos 2\pi\left(\left(X-\frac{m}{M}\right),k\right) \right\} \quad (44)$$

In the formula (44), {*} approaches the delta function when the maximum frequency K is sufficiently large. That is, the formula (44) takes such a form that the sampling data is expanded by the delta function.

The neural element of the neural network system is composed typically of the sigmoid function. It is therefore required that the Fourier series be approximated by the sigmoid function. If the sensitivity of the sigmoid function is sufficiently large, the sigmoid function can be approximated by a step function. Hence, this is almost equivalent to such an operation as the Fourier series approximated by the step function.

Figure 9:
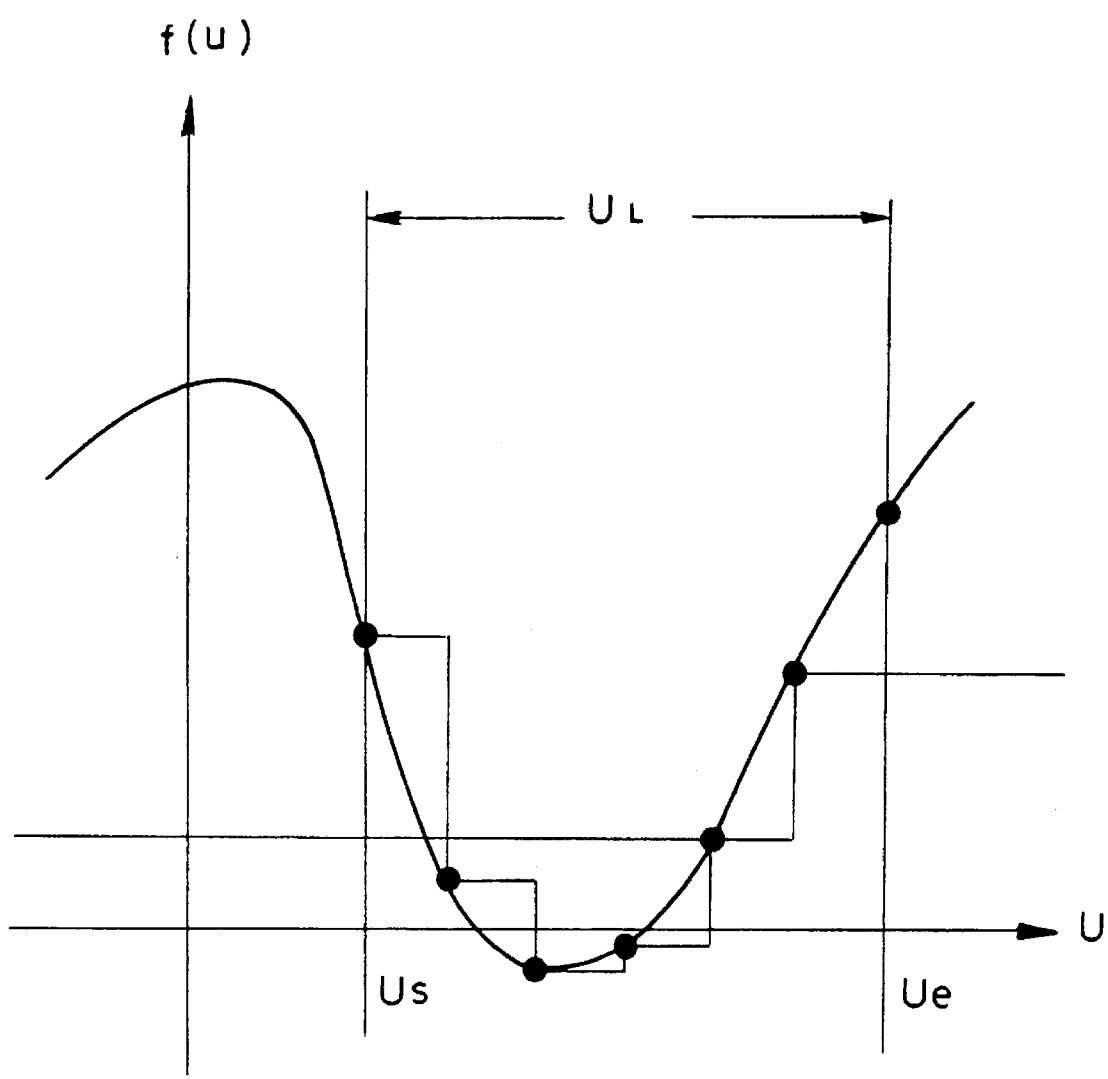
FIG. 9 is a chart of assistance in explaining an approximation of an arbitrary function by a sigmoid function in the second embodiment.

Now, It is assumed that, as illustrated in FIG. 9, a section $u_L = u_e - u_s$ is divided by equally by L with respect to a one-dimensional function f(u), and the approximation is effected with a sigmoid function g(u) having a sufficiently high sensitivity. This is expressible by the formula (45):

$$f(u) \simeq f(u_s)g(u-u_s) + \sum_{l=1}^{L-1}\left\{f\left(\frac{l}{L}u_L+u_s\right)-f\left(\frac{l-1}{L}u_L+u_s\right)\right\} \times g\left(u-\frac{l}{L}u_L-u_s\right) \quad (45)$$

Then, $$u(X) = 2\pi((x-m/M), k) \quad (46)$$

Thinking especially about the trigonometric function as f(u), $$f(X) = f(u(X)) = \cos 2\pi u(X) \quad (47)$$

$$= \cos 2\pi\left(\left(X-\frac{m}{M}\right),k\right) \quad (48)$$

$$\simeq \cos 2\pi u_s g(u-u_s) + \quad (49)$$

$$\sum_{l=1}^{L-1}\left\{\cos 2\pi\left(\frac{l}{L}u_L+u_s\right)-\cos 2\pi\left(\frac{l-1}{L}u_L+u_s\right)\right\} \times g\left(u-\frac{l}{L}u_L-u_s\right)$$

Namely, the written expression is such as:

$$f(X) \simeq \cos 2\pi A(k,m)g\left(\left(\left(X-\frac{m}{M}\right),k\right)-A(k,m)\right) + \quad (50)$$

$$\sum_{l=1}^{L-1}\left\{\cos 2\pi\left(\frac{1}{L(k)}C(k,m)+A(k,m)\right)-\cos 2\pi\left(\frac{l-1}{L(k)}C(k,m)+A(k,m)\right)\right\} \times$$

$$g\left(\left(\left(X-\frac{m}{M}\right),k\right)-\frac{l}{L(k)}C(k,m)-A(k,m)\right)$$

Herein, $$A(k,m) = u_s \quad (51)$$

$$= -\sum_{i=1}^{N}\frac{k_i m_i}{M}\delta + (k_i) + \sum_{i=1}^{N}k_i\left(1-\frac{m_i}{M}\right)\delta - (k_i) \quad (52)$$

$$B(k,m) = u_e \quad (53)$$

$$= \sum_{i=1}^{N}\left(1-\frac{m_i}{M}\right)\delta + (k_i) - \sum_{i=1}^{N}k_i\frac{m_i}{M}\delta - (k_i) \quad (54)$$

where mi/M is the input value of the learning data. However, $$\delta + (k_i) = \begin{cases} 1 & k_i \geq 0 \\ 0 & k_i < 0 \end{cases} \quad (55)$$

$$\delta - (k_i) = \begin{cases} 0 & k_i > 0 \\ 1 & k_i \leq 0 \end{cases} \quad (56)$$

$$C(k,m) = u_L \quad (57)$$
$$= u_e - u_s$$

$$L(k) = \|k\| \quad (58)$$

When substituting the formula (50) of the trigonometric function approximated by the sigmoid function into the formula (44) of the Fourier-expanded function f(X), the formula (60) is eventually obtained.

$$y = f(X) \quad (59)$$

$$= \sum_{k=-K}^{K}\sum_{m=0}^{M}\left(\frac{1}{M}\right)^N f\left(\frac{m}{M}\right)(\cos 2\pi aA)g\left((k,X)-\frac{(m,k)}{M}-A\right) + \sum_{k=-K}^{K}\sum_{m=0}^{M}\left(\frac{1}{M}\right)^N f\left(\frac{m}{M}\right) \times \quad (60)$$

$$\sum_{l=1}^{L-1}\left\{\cos 2\pi\left(\frac{l}{L}C+A\right)-\cos 2\pi\left(\frac{l-1}{L}C+A\right)\right\} \times g\left((k,X)-\frac{(m,k)}{M}-\frac{l}{L}C-A\right)$$

For the purpose of providing a good insight, however, arguments of A (k, m), B (k, m), C (k, m) and L (k) are omitted. Herein, $\alpha_j$, $\omega_i$ and $\beta_j$ are placed as below:

$$\alpha_j = \begin{cases} \left(\frac{1}{M}\right)^N f\left(\frac{m}{M}\right)(\cos 2\pi A) \quad \text{or} \\ \left(\frac{1}{M}\right)^N f\left(\frac{m}{M}\right)\left\{\left(\cos 2\pi\left(\frac{l}{L}C+A\right)-\right.\right. \\ \left.\left.\left(\cos 2\pi\left(\frac{l-1}{L}C+A\right)\right)\right\} \end{cases} \quad (61)$$

$$\omega_i = k_i \quad (62)$$

$$\beta_j = \begin{cases} \frac{(m,k)}{M}+A \\ \frac{(m,k)}{M}+\frac{l}{L}C+A \end{cases} \quad (63)$$

The formula (60) takes the form of a 3-layer neural network expressed by the following formula (65) in which only the intermediate layer (11b) is the sigmoid function.

$$y = f(X) \quad (64)$$

$$= \sum_j \alpha_j g\left(\sum_i \omega_i x_i - \beta_j\right) \quad (65)$$

In the embodiment shown in FIG. 8, the maximum frequency of the function f(X) to be approximated is given such as K=1, and hence the connecting weight between the input layer (11a) and the intermediate layer (11b) is set such as k=−1, 0, 1. Referring to the Figure, portions of the same connecting weight are encircled. Two pieces of assumed sampling data are provided such as m=0, 1. Set as a bias in the intermediate layer (11b) is a value calculated from the frequency k and the input value m of the sampling data as expressed by the formula (63). Set as a connecting weight between the intermediate layer (11b) and the output layer (11c) is, as shown by the formula (61), a value α obtained by multiplying the value calculated from the frequency k and the input value m of the sampling data by an output f(m/M) of the sampling data and a certain coefficient $(1/M)^N$. In this case also, the portions of the same connecting weight are encircled. Where the neural network system is constructed in this manner, the repetitive computations as performed in the back propagation are not needed by use of the formulae (61) through (68) when giving an arbitrary input of the learning data. Values of all the connecting weights can be known and set by calculations directly from the assumed sampling data. A desired output value is thereby obtained.

Note that in the neural network system according to this embodiment, the error at a regenerative point of the function f(X) is controllable by adjusting the maximum frequency K and the approximation degree L of the trigonometric function by the sigmoid function.

$(KM)^N L$ pieces of neural element are required in the intermediate layer (11b). In the embodiment shown in FIG. 8, the number of neural elements in the intermediate layer (11b) is 18. The variables are defined as follows:

(1) K: the maximum frequency of the function of the function f(X) to be approximated.

(2) M: the number of data in each input dimension (3) L: the exactitude of approximation of the trigonometric function by the sigmoid function.

(4) N: the dimensions of input.

In the embodiment given above, K=1, M=2, L=2, and N=1. Namely, the function f(X) can be approximation-regenerated accurately with an increase in the number of neural elements of the intermediate layer (11b).

It is recognized that the connecting weight can be determined on the assumption of the sampling data. Therefore, the repetitive calculations are next effected in the following manner with the connecting weight serving as an initial value with respect to the learning data given at irregular intervals. Learning for the learning data is thus performed. More specifically, when giving the learning data to the neural network system, a squares-error of an actually obtained output in the output layer (11c) and a desired output is considered, and the sampling data is adjusted to minimize this error. Let $(X_m, \hat{y}_m)$ be the sampling data, and let $(X_p, y_p)$ be the learning data. The squares-error E in the output layer (11c) is defined as expressed in the formula (66).

$$E = \frac{1}{2} \sum_{p=1}^{P} \{y_p - \hat{f}(X_p)\}^2 \quad (66)$$

where f(X) is the formula (64) regenerated from the formulae (61)–(63). Considering the fact that only $\alpha_j$ is influenced by ŷm, an expression is given again as shown in the formula (68).

$$y = \hat{f}(X) \quad (67)$$

$$= \sum_j \alpha_j(\hat{y}_m) g\left(\sum_i \omega_i x_i - \beta_j\right) \quad (68)$$

Hence, for minimizing E, the output of the sampling data may be adjusted by, e.g., the steepest descent method as below:

$$\hat{y}_m^{new} = \hat{y}_m^{old} + \Delta\hat{y}_m^{old} \quad (69)$$

However, $$\Delta\hat{y}_m^{old} = -\beta \frac{\partial E}{\partial \hat{y}_m^{old}} \quad (70)$$

$$= \beta \sum_{p=1}^{P} (y_p - \hat{f}(X_p)) \left\{ \sum_j \frac{\partial \alpha_j(\hat{y}_m)}{\partial \hat{y}_m} g\left(\sum_i \omega_i x_i - \beta_j\right) \right\} \quad (71)$$

$$\alpha_j = \left(\frac{1}{M}\right)^N (\cos 2\pi A) \quad (72)$$

$$= \left(\frac{1}{M}\right)^N \left\{ \cos 2\pi \left(\frac{l}{L} C + A\right) - \cos 2\pi \left(\frac{l-1}{L} C + A\right) \right\}$$

Considering further the term of acceleration, the expression is given as shown in the formula (73).

$$\frac{d^2\hat{y}_m}{dt^2} + (1-\alpha)\frac{d\hat{y}_m}{dt} = -\beta \frac{\partial E}{\partial \hat{y}_m} \quad (73)$$

However, the description is given in the form of not the difference equation but the differential equation.

Note that when assuming no sampling data greater than the maximum frequency of the function with which the learning data is created at tills time, the function f(X) which satisfies the learning data can not be theoretically configured Hence, if the sampling data lack, it is necessary to increment the number off the sampling data by increasing the assumed maximum frequency. There exists a relation shown in the formula (74) between the maximum frequency K and the sampling data number M. Therefore, it follows that the number of sampling data increases with the higher assumed maximum frequency K.

$$M = 2K + 1 \quad (74)$$

Figure 10:
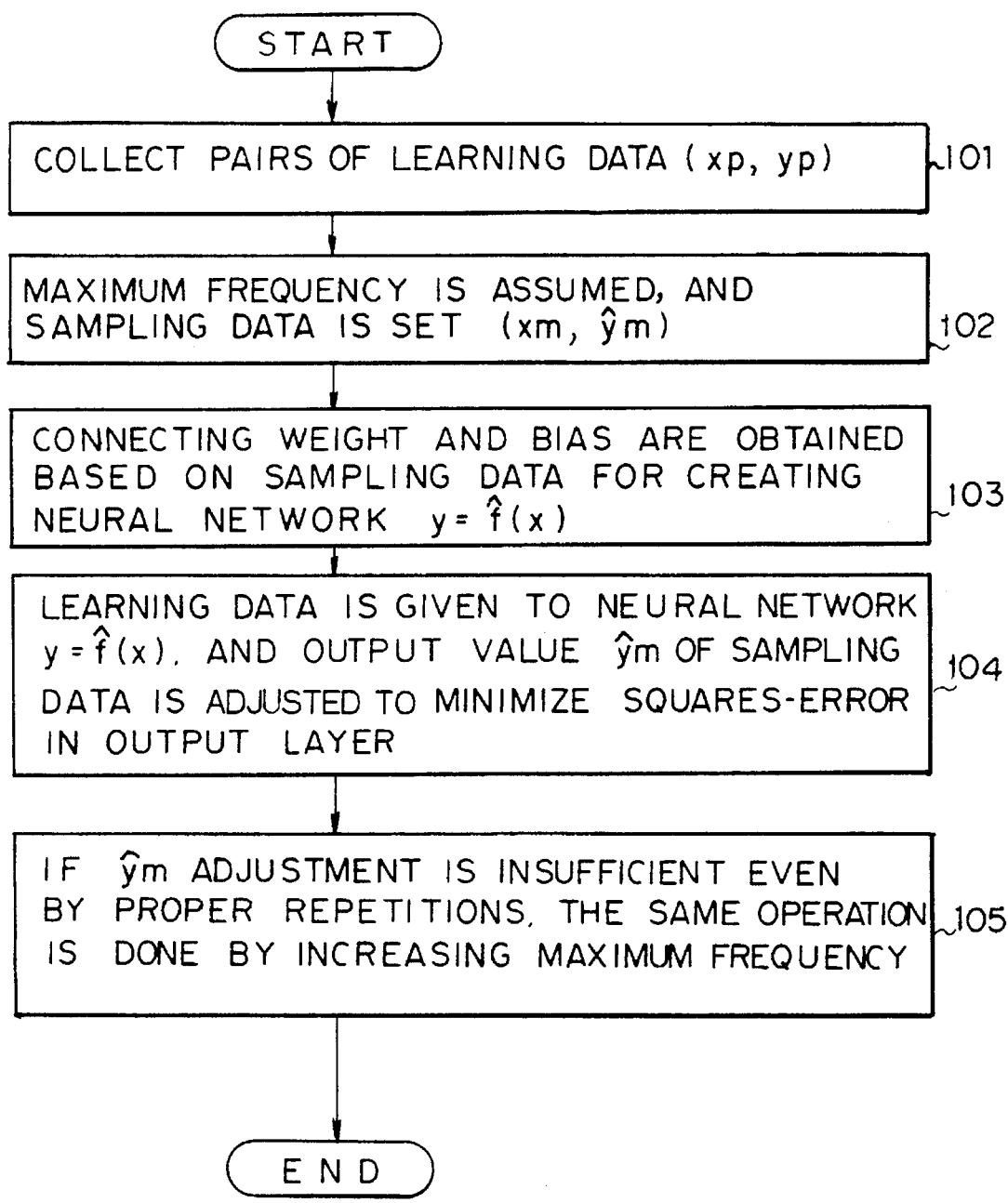
FIG. 10 is a flowchart showing the whole operations in the second embodiment.
Figure 11:
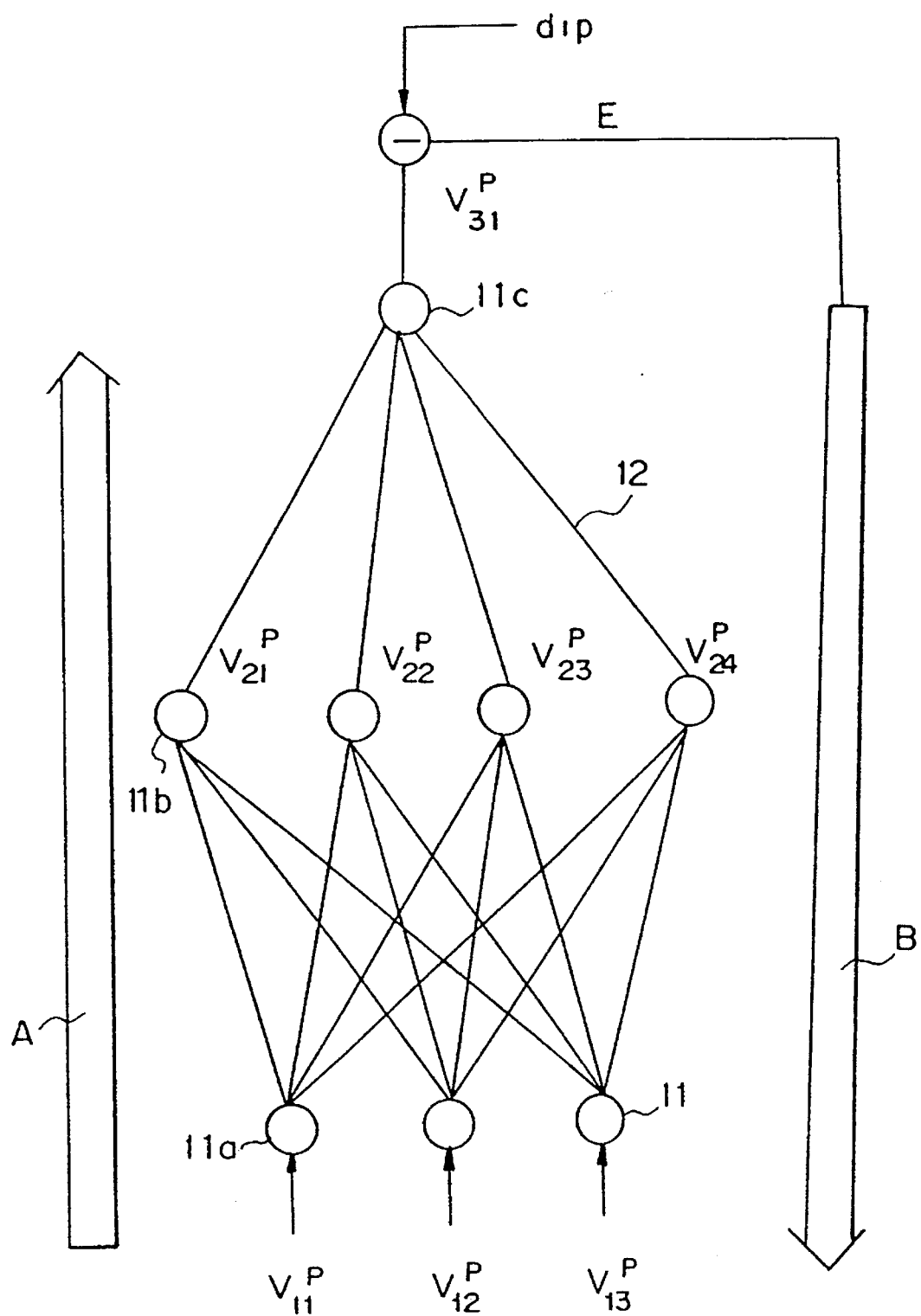
FIG. 11 is an explanatory diagram illustrating a configuration of a conventional 3-layer feedforward type neural network system.

FIG. 10 is a flowchart showing the entire operations. Pairs of learning data are prepared in step (101). Initial values of the maximum frequency K and the sampling data are set in step (102). Next, a connecting weight and a bias are calculated based on the sampling data in step (103). A neural network is thus prepared. In step (104), the sampling data is adjusted to minimize the error E in the learning data. If the adjustment is insufficient in step (105), the sampling data is adjusted on the assumption of a much higher maximum frequency. If the error is sufficiently small in step (106), processing is ended.

A method of setting the initial value of sampling data in step (102) may be based on an estimation from $y_p$ in the vicinity thereof by a linear interpolation. The initial value of the maximum frequency K is empirically determined; or, as another method, a 2-fold inverse number of the number of learning data is set. As a method of incrementing the sampling data when increasing the maximum frequency in step (105), the sampling data may be incremented in sequence of natural numbers such as 1, 2, 3, 4, 5, 6, 7 . . . or alternatively based on multiples such as 1, 2, 4, 8, 16, 32, 64 . . . An additional method is that the new sampling data is estimated from the old sampling data by the linear interpolation.

As discussed above, in accordance with the embodiment given above, fast learning is attainable because of the high-speed convergence of the repetitive computations for learning. Furthermore, when knowing the intricacy of the information source from which the learning data is created, i.e., the maximum Frequency, it is feasible to determine the necessary number or neural elements of the intermediate layer.

Note that the number of neural elements configuring the neural network and the number of layers thereof are not limited to those shown in the above-described embodiment but may be modified according to the applied fields. In the embodiment given above, the input layer (11a) is single but is not limited to this number.

As explained earlier, in the neural network system of this present invention consisting of the input layer, the intermediate layer and the output layer and including a plurality of neural elements for simulating the neurons of a living body and also including the connecting weights for providing inter-layer connections in the neural elements, the sampling data configured by pairs of regular interval input values and output values corresponding thereto are assumed with respect to the learning data configured by pairs of irregular interval input values and output values corresponding thereto. Stored in the neural element of the intermediate layer is the sampling function which moves in parallel by the input value of the sampling data. The output value of the sampling data is set as a connecting weight for providing the connection between the intermediate layer and the output layer. Alternatively, the function with which the assumed sampling data is created is expanded by the sampling function. The sampling function is expanded by the trigonometric function, thereby obtaining a frequency. The trigonometric function is approximated by the sigmoid function. Using these procedures, the frequency is set as a connecting weight for providing the connection between the input layer and the intermediate layer. Set as a bias of the intermediate layer is a value calculated from the frequency and the input value of the sampling data. Set as a connecting weight for providing the connection between the intermediate layer and the output layer is a value calculated from the frequency, Input value of the sampling data and the output value of the sampling data. The output value of the sampling data is adjusted by the learning equation to locally minimize an error between the output value of learning data and the output obtained when giving the input value of learning data. As a result, the convergence of the repetitive computations for learning becomes fast, which in turn leads to Fast learning. Moreover, when knowing the intricacy of the information source from which the learning data is created, viz., the maximum frequency, the necessary number of neural elements of the intermediate layer can be determined. Such a neural network system can be thereby constructed.

Although the illustrative embodiments of the present invention have been described in detail with reference to the accompanying drawings, it is to be understood that the present invention Is not limited to those embodiments. Various changes or modifications may be effected therein by one skilled in the art without departing from the scope or spirit of the invention.

What is claimed is:

1. A neural network system comprising:
    an input layer, an intermediate layer and an output layer each layer containing at least one neural element, each having an input and an ouput, for simulating a neuron; and a plurality of inter-layer connections between neural elements wherein each neural element input layer has a connection from the ouput to the input of at least one neural element in the intermediate layer, each neural element in the intermediate layer has a connection from the ouput to the input of at least one neural element in the output layer, and each inter-layer connection has a connecting weight;
    sampling data having a plurality pairs of sampling data values, each pair of sampling data values including a sampling data input value and a corresponding sampling data output value wherein the sampling data input values have regular intervals, and learning data having at least three pairs of learning data values, each pair of learning data values including a learning data input value and a corresponding desired output value wherein the learning data input values have irregular intervals;
    wherein each neural element of said intermediate layer is assigned a unique pair of sampling data values and has a unique sampling function derived by translating an original sampling function by the sampling data input value assigned to the neural element, wherein the sampling function defines a relationship between the input and output of the neural element;
    wherein said connecting weight for each connection between a neural element in said intermediate layer and a neural element in said output layer is set to the sampling data output value assigned to the neural element in the intermediate layer; and
    means for training the neural network including means for adjusting the connecting weights so as to minimize an error between a learning data output value and an actual output value obtained by applying a learning data input value to the neural network.

2. A neural network as set forth in claim 1, further comprising means for deriving said sampling data values from said learning data values, wherein said plurality of pairs of sampling data comprises a predefined number of pairs of sampling data, and the plurality of neural elements in the intermediate layer comprises the predefined number of neural elements.

3. A neural network system comprising:
    an input layer, an intermediate layer and an output layer each layer containing at least one neural element each having an input, an output and a bias for simulating neurons; and a plurality of inter-layer connections between neural elements wherein each neural element in the input layer has a connection to at least one neural element in the intermediate layer, each neural element in the intermediate layer has a connection to at least one neural element in the output layer, and each inter-layer connection has a connecting weight;
    sampling data having a plurality of pairs of sampling data values, each pair of sampling data values including a sampling data input value and a corresponding sampling data output value wherein the sampling data input values have regular intervals, and learning data having at least three pairs of learning data values, each pair of learning data values including a learning data input value and a corresponding desired output value wherein the learning data input values have irregular intervals;
    wherein said sampling data is created using a sampling function that is approximated by a sigmoid function; and wherein said sampling function is expanded by a trigonometric function to obtain a frequency;
    wherein said connecting weights for the connections between neural elements in said input layer and neural elements in said intermediate layer are set to said frequency; wherein the bias of a neural element in said intermediate layer is set to the sampling data input value;
    wherein said connecting weights for the connections between said intermediate layer and said output layer are set to a value calculated from said frequency, said sampling data input value and said sampling data output value, of said neural elements of the intermediate layer; and
    means for training the neural network including means for adjusting the connecting weights so as to minimize an error between a learning data output value and an actual output value obtained by applying a learning data input value to the neural network.

4. A neural network as set forth in claim 3, further comprising means for deriving said sampling data values from said learning data values, wherein said plurality of pairs of sampling data comprises a predefined number of pairs of sampling data, and the plurality of neural elements in the intermediate layer comprises the predefined number of neural elements.

5. The method of claim 3, wherein the predefined number of pairs of sampling data values is M where M is an integer, each sampling data pair having N dimensions where N is an integer, the trigonometric function is approximated by a sigmoid function with an approximation degree L where L is an integer, and the number of neural elements in the intermediate layer is at least $(M)^N L$.

6. A neural network system for learning from a plurality of pairs of learning data values, each pair of learning data values including a learning data input value and a corresponding desired output value, said learning data input values having irregular intervals, said neural network system comprising:

means for deriving, from said pairs of learning data values, a predefined number of pairs of sampling data values, each pair of sampling data values including a sampling data input value and a corresponding sampling data output value, said sampling data input values having regular intervals;

an input layer containing at least one neural element;

an intermediate layer containing said predefined number of neural elements, each neural element of said intermediate layer having an input and an output and being uniquely associated with one of said predefined number of pairs of sampling data values, each neural element of said intermediate layer having a unique sampling function derived by translating an original sampling function by the sampling data input value assigned to the neural element, wherein the samping function defines a relationship between the input and the output on the neural element;

an output layer containing at least one neural element; and a plurality of connections for connecting the output of each neural element of the input layer to at least one neural element of the intermediate layer, and each neural element of said intermediate layer to a neural element of said output layer, each connection between a neural element of the intermediate layer and a neural element of the output layer having a connecting weight whose value is defined according to the sampling data output value of the pair of sampling data values which is uniquely associated with the intermediate layer neural element to which the given connection is connected.

7. A neural network as set forth in claim 6, wherein the neural network approximates the function y=f(x), wherein f(x) has a maximum frequency, and the number of said neural elements in the intermediate layer and said sampling data is equal to at least said maximum frequency.

8. A neural network system according to claim 6, further comprising means for adjusting said sampling data output value by using a learning equation to locally minimize an error between a desired output value of a selected learning data pair and an actual output value obtained from applying input value of the selected learning data pair to the neural network.

9. A neural network as set forth in claim 8, wherein said means for adjusting includes means for applying the steepest descent function.

10. The neural network system of claim 6, further comprising means for training the neural network including means for adjusting the connecting weights so as to minimize an error between a learning data output value and an actual output value obtained by applying a learning data input value to the neural network.

11. A neural network system for learning from a plurality of pairs of learning data values to approximate a first function, each pair of learning data values including a learning data input value and a corresponding desired output value, said learning data input values having irregular intervals, said neural network system comprising:

means for deriving a predefined number of pairs of sampling data values, each pair of sampling data values including a sampling data input value and a corresponding sampling data output value, said sampling data input values having regular intervals;

means for expanding a sampling function by a trigonometric function to obtain a frequency;

an input layer containing at least one neural element;

an intermediate layer containing said predefined number of neural elements, each neural element of said intermediate layer being uniquely associated with one of said predefined number of pairs of sampling data values, each neural element of said intermediate layer having a bias set to a value calculated from said frequency and the input value of the uniquely associated pair of sampling data values;

a plurality of first connections for connecting each neural element of said intermediate layer to each neural element of said input layer, each first connection having a connecting weight set to said frequency;

an output layer containing at least one neural element and a plurality of second connections for connecting each neural element of said intermediate layer to a neural element of said output layer, wherein at least one second connection has a connecting weight whose value equals a value calculated from said frequency and the pair of sampling data values which is uniquely associated with the intermediate layer neural element to which the given second connection is connected.

12. A neural network system as set forth in claim 11, wherein the predefined number of sampling data is an integer M, sampling data value having N dimensions where N is an integer, the first function has a maximum frequency K where K is an integer, the trigonometric function is approximated by a sigmoid function with an approximation degree L where L is an integer, and the number of neural elements in the intermediate layer is at least $(KM)^N L$.

13. A neural network system according to claim 11, further comprising means for adjusting said sampling data output value by a learning equation to locally minimize an error between a desired output value of a selected learning data pair and an actual output value obtained from applying the input value.

14. A neural network system as set forth in claim 13, wherein said means for adjusting includes means for applying the steepest descent function.

15. A neural network system according to claim 11, wherein said means for deriving a predefined number of pairs of sampling data values includes means for applying a regularizing function to said pairs of learning data values.

16. A method for initializing a neural network system using a plurality of pairs of learning data values, each pair of learning data values including a learning data input value and a corresponding desired output value, said learning data input values having irregular intervals, said neural network system having an input layer containing at least one neural element; an intermediate layer containing a predefined number of neural elements, each element of the intermediate layer having a sampling function, each neural element of said input layer having a connection to at least one neural element of said intermediate layer; an output layer containing at least one neural element, each neural element of said intermediate layer having a connection to at least one neural element of said output layer; and each said connection, between a neural element in said intermediate layer and a neural element in said output layer, having a connecting weight; said method comprising the steps of:

deriving, from said pairs of learning data values, the predefined number of pairs of sampling data values, each pair of sampling data values including a sampling data input value and a corresponding sampling data output value, said sampling data input values having regular intervals;

associating each neural element of said intermediate layer with one of said predefined number of pairs of sampling data values;

defining said sampling function of each neural element in the intermediate layer by translating a general sampling function by the sampling data input value assigned to the neural element; and setting the connecting weight associated with each connection equal to the sampling data output value of the pair of sampling data values which is uniquely associated with the intermediate layer neural element which the connection connects.

17. The method of claim 16 further comprising the steps of:

applying a learning data input value of one of said pairs of learning data values to the input layer of the neural network, obtaining an actual output value from the output layer of the neural network;

calculating an error between the desired output value corresponding to the applied input value and the obtained actual output value;

adjusting the sampling data output values on said pairs of sampling data values according to a learning equation adapted minimize said error; and setting the connecting weights of the connections between the intermediate and output layers to equal the adjusted sampling data output values.

18. The method of claim 17, wherein the learning equation is the steepest descent function.

19. The method of claim 16, wherein the neural network approximates the function y=f(x), wherein f(x0) has a maximum frequency, and the number of said neural elements in the intermediate layer and the numbers of said pairs of sampling data is equal to at least said maximum frequency.

20. A method for initializing a neural network system according to claim 16, further comprising the step of adjusting said connecting weights according to a learning equation to locally minimize an error between a desired output value and an actual output value derived from a learning data input value applied to the input layer.

21. A method for initializing a neural network system using a plurality of pairs of learning data values, each pair of learning data values including a learning data input value and a corresponding desired output value, said learning data input values having irregular intervals, said neural network system having an input layer containing at least one neural element, an intermediate layer containing a plurality of neural elements, each neural element of said intermediate layer having a bias, a plurality of first connections for connecting each neural element of said input layer to at least one neural element of said intermediate layer, each first connection having a first connecting weight; an output layer containing at least one neural element, and a plurality of second connections for connecting each neural element of said intermediate layer to a neural element of said output layer, a given second connection having a second connecting weight, comprising the steps of:

deriving a predefined number of pairs of sampling data values, each pair of sampling data values including a sampling data input value and a corresponding sampling data output value, said sampling data input values having regular intervals;

expanding a sampling function by a trigonometric function to obtain a frequency;

associating each neural element of said intermediate layer uniquely with one of said predefined number of pairs of sampling data values;

for each neural element in the intermediate layer, setting the bias to a value calculated from the frequency and the input value of the pair of sampling data values uniquely associated with the neural element, setting said first connecting weight equal to said frequency; and for each second connection weight of each neural element in the intermediate layer, setting the second connection weight to a value calculated from said frequency and the pair of sampling data values which are uniquely associated with the neural element of the intermediate layer.

22. The method of claim 21 further comprising the steps of:

applying a learning data input value of one of said pairs of learning data values to the input layer of the neural network, obtaining an actual output value from the output layer of the neural network;

calculating an error between the desired output value corresponding to the applied input value and said actual output value;

adjusting the sampling data output values of said pairs of sampling data values according to a learning equation adapted to minimize said error; and setting the connecting weights of the connections between the intermediate and output layers to equal the adjusted sampling data output values.

23. The method of claim 22, wherein the learning equation is the steepest descent function.

24. The method of claim 21, wherein there are M pairs of sampling data, each sampling data pair having N dimensions, the first function has a maximum frequency K, the trigonometric function is approximated by a sigmoid function with an approximation degree L, and the number of neural elements in the intermediate layer is at least $(KM)^N L$.

25. A method according to claim 21, further comprising the step of adjusting said sampling data output value by a learning equation to locally minimize an error between said desired output value and an actual output value derived from a learning data input value.

26. A method for training a neural network system according to claim 21, wherein said step of deriving a predefined number of pairs of sampling data values includes a step of applying a regularizing function to said pairs of learning data values.

27. A method for initializing and training a neural network system using a plurality of pairs of learning data values, each pair of learning data values including a learning data input value and a corresponding desired output value, said learning data input values having irregular intervals; and a predefined number of pairs of sampling data values, each pair of sampling data values including a sampling data input value and a corresponding sampling data output value, said sampling data input values having regular intervals; said neural network system having an input layer containing at least one neural element; an intermediate layer containing at least one neural element, each element of the intermediate layer having a sampling function, each neural element of said input layer having a connection to at least one neural element of said intermediate layer; an output layer containing at least one neural element, each neural element of said intermediate layer having a connection to at least one neural element of said output layer; and each said connection, between a neural element in said intermediate layer and a neural element in said output layer, having a connecting weight; said method comprising the steps of:
 a) initializing the neural network, comprising the steps of
  i) uniquely associating each neural element of said intermediate layer with one of said pairs of sampling data values,
  ii) defining the sampling function of each neural element in the intermediate layer by translating a general sampling function by the sampling data input value assigned to the neural element, and
  iii) for each connection between a neural element of the intermediate layer and a neural element of the output layer, setting the connecting weight associated with the connection to the sampling data output value of the pair of sampling data values which is uniquely associated with the intermediate layer neural element; and
 b) training the neural network, comprising steps of
  i) applying a learning data input value of one of said pairs of learning data values to the input layer of the neural network,
  ii) obtaining an actual output value from the output layer of the neural network,
  iii) calculating an error between the desired output value corresponding to the applied learning data input value and the obtained actual output value,
  iv) adjusting the connecting weights of the connections between the intermediate and output layers according to a learning equation adapted to minimize said error.

28. The method of claim 27, wherein the neural network approximates the function y=f(x), wherein f(x) has a maximum frequency, and the number of said neural elements in the intermediate layer and the number of said pairs of sampling data is equal to at least said maximum frequency.

29. The method of claim 27, wherein the learning equation is the steepest descent function.

30. A method for initializing and training a neural network according to claim 27, further comprising a step for deriving said predefined number of pairs of sampling data values from said pairs of learning data values.

31. A method for initializing and training a neural network system using a plurality of pairs of learning data values, each pair of learning data values including a learning data input value and a corresponding desired output value, said learning data input values having irregular intervals; a predefined number of pairs of sampling data values, each pair of sampling data values including a sampling data input value and a corresponding sampling data output value, said sampling data input values having regular intervals said neural network system having an input layer containing at least one neural element, an intermediate layer containing a plurality of neural elements, each neural element of said intermediate layer having a bias, a plurality of first connections for connecting each neural element of said input layer to at least one neural element of said intermediate layer, each first connection having a first connecting weight; an output layer containing at least one neural element, and a plurality of second connections for connecting each neural element of said intermediate layer to a neural element of said output layer, a given second connection having a second connecting weight, comprising the steps of:
 a) initializing the neural network, comprising the steps of
  i) associating each neural element of said intermediate layer uniquely with one of said predefined number of pairs of sampling data values,
  ii) expanding a sampling function by a trigonometric function to obtain a frequency,
  iii) for each neural element in the intermediate layer, setting the bias to a value calculated from the frequency and the input value of the pair of sampling data values uniquely associated with the neural element,
  iv) setting said first connecting weight equal to said frequency, and
  v) for each second connection weight of each neural element in the intermediate layer, setting the second connection weight to a value calculated from said frequency and the pair of sampling data values which are uniquely associated with the neural element of the intermediate layer; and
 b) training comprising
  i) applying a learning data input value of one of said pairs of learning data values to the input layer of the neural network,
  ii) obtaining an actual output value from the output layer of the neural network,
  iii) calculating an error between the desired output value corresponding to the applied learning data input value and said actual output value,
  iv) adjusting the connecting weights of the connections between the intermediate and output layers according to a learning equation adapted to minimize said error.

32. The method of claim 31, wherein the predefined number of pairs of sampling data values is M where M is an integer, each sampling data pair having N dimensions where N is an integer, the trigonometric function is approximated by a sigmoid function with an approximation degree L where L is an integer, and the number of neural elements in the intermediate layer is at least $(M)^N L$.

33. The method of claim 31, wherein the learning equation is the steepest descent function.

34. A method for initializing and training a neural network according to claim 31, further comprising a step for deriving said predefined number of pairs of sampling data values from said pairs of learning data values.

35. A neural network system for learning from a plurality of pairs of learning data values, each pair of learning data values including a learning data input value and a corresponding desired output value, said learning data input values having irregular intervals, said neural network system comprising:

means for deriving, from said pairs of learning data values, a predefined number of pairs of sampling data values, each pair of sampling data values including a sampling data input value and a corresponding sampling data output value, said sampling data input values having regular intervals;

an input layer containing at least one neural element;

an intermediate layer containing said predefined number of neural elements, each neural element of said intermediate layer having an input and an output and being uniquely associated with one of said predefined number of pairs of sampling data values, each neural element of said intermediate layer having a unique sampling function derived by translating an original sampling function by the sampling data input value assigned to the neural element, wherein the sampling function defines a relationship between the input and the output on the neural element;

an output layer containing at least one neural element; and a plurality of connections for connecting the output of each neural element of the input layer to at least one neural element of the intermediate layer, and each neural element of said intermediate layer to a neural element of said output layer, each connection between a neural element of the intermediate layer and a neural element of the output layer having a connecting weight whose value is defined according to the sampling data output value of the pair of sampling data values which is uniquely associated with the intermediate layer neural element to which the given connection is connected.

* * * * *

UNITED STATES PATENT AND TRADEMARK OFFICE
CERTIFICATE OF CORRECTION

PATENT NO. : 5,590,243
DATED : December 31, 1996
INVENTOR(S) : Yoshiakira Akimoto, Hideo Tanaka, Hiromi Ogi, Yoshio Izui, Hisao Taoka and Toshiaki Sakaguchi It is certified that error appears in the above-indentified patent and that said Letters Patent is hereby corrected as shown below:

On the title page: Item [73]

Assignee: Mitsubishi Denki Kabushiki Kaisha, please add "The Tokyo Electric Power Company, Incorporated, Tokyo, Japan"

Signed and Sealed this

Seventeenth Day of June, 1997

Attest:

BRUCE LEHMAN

*Attesting Officer*     *Commissioner of Patents and Trademarks*